United States Patent [19]

Henderson

[11] 4,214,921
[45] Jul. 29, 1980

[54] METHOD OF MANUFACTURING A CORROSION RESISTANT ROTOR ASSEMBLY

[75] Inventor: David L. Henderson, O'Fallon, Mo.

[73] Assignee: Emerson Electric Co., St. Louis, Mo.

[21] Appl. No.: 25,356

[22] Filed: Mar. 30, 1979

Related U.S. Application Data

[60] Continuation-in-part of Ser. No. 920,663, Jun. 30, 1978, which is a division of Ser. No. 663,146, Mar. 2, 1976, Pat. No. 4,113,518.

[51] Int. Cl.² ............................................. H02K 15/02
[52] U.S. Cl. ..................................... 148/6.35; 29/598; 148/122; 310/45
[58] Field of Search ........................ 29/598; 310/42, 45; 427/104, 318; 148/113, 110, 122, 6.35

[56] References Cited

U.S. PATENT DOCUMENTS

| | | | |
|---|---|---|---|
| 1,318,027 | 10/1919 | Thompson | 148/6.35 |
| 1,362,213 | 12/1920 | Andrews | 148/6.35 |
| 2,227,156 | 12/1940 | Reardon | 148/113 X |
| 3,373,485 | 3/1968 | Nelsen | 29/598 |
| 3,990,141 | 11/1976 | Stark | 310/42 |
| 4,113,518 | 9/1978 | Henderson | 148/6.15 Z |

Primary Examiner—Ralph S. Kendall
Attorney, Agent, or Firm—Polster, Polster and Lucchesi

[57] ABSTRACT

A method of manufacturing a corrosion resistant rotor assembly including heating the core of the rotor assembly which is made of a stack of thin steel laminations to a temperature sufficient so as to cause at least some oxidation of the core and the quenching the core in a temperature controlled bath of suitable oil so as to form a tough, corrosion resistant surface on the exposed surfaces of the rotor assembly.

9 Claims, 2 Drawing Figures

METHOD OF MANUFACTURING A CORROSION RESISTANT ROTOR ASSEMBLY

CROSS REFERENCE TO A RELATED APPLICATION

This is a continuation-in-part of U.S. patent application Ser. No. 920,663, filed June 30, 1978 which is a divisional of U.S. Patent application Ser. No. 663,146, filed Mar. 2, 1976 now U.S. Pat. No. 4,113,518.

BACKGROUND OF THE INVENTION

This invention relates to a method of manufacturing a rotor assembly of a dynamoelectric machine, and more particularly relates to an improved method of treating a squirrel cage rotor assembly for resisting corrosion on the exposed surfaces of the rotor assembly.

Conventionally, rotor assemblies of dynamoelectric machines (and in particular fractional horsepower motors) are treated so as to protect their exposed surfaces (i.e., those surfaces liable to corrode or rust) from rust or other corrosion which tends to form thereon. It has been found that a sufficient quantity of corrosion or rust on the outer surfaces of a rotor body will bridge the air gap between the rotor and the adjacent teeth of the stator core resulting in arcing between the stator and the rotor and thus preventing the motor from starting. Conventionally, prior art rotors had a zinc chromate solution applied to their outside surfaces so as to inhibit the formation of rust or corrosion. Also, several prior art rotor treatment processes required several intermediate process steps which, of course, were time consuming and costly in the manufacture of rotor assemblies.

More specifically, the method of this invention is an improvement of the method disclosed in my prior U.S. Pat. No. 4,113,518 issued Sept. 12, 1978 and assigned the the assignee of the present invention. In my prior patent, a method of treating a rotor assembly is described in which the rotor assembly is heated to a temperature (e.g., about 900° F. or 482° C.) sufficient to permit shrink fitting of the rotor core on the rotor shaft. The rotor assembly is then cooled in a water quench bath. The rotor assembly is then cleaned, rinsed, pickled, and treated with a surface oil retention solution (e.g., a water solution of zinc phosphate). Then, the rotor assembly is rinsed, dried, and finally dipped in a solvent based, water displacing oil which is preferably maintained at an elevated temperature (e.g., about 180° F. or 84° C.).

Among the several objects and features of this invention may be noted the provision of an improved method or process of manufacturing a rotor assembly which is faster, which involves fewer manufacturing steps, and which results in a corrosion resistant treatment for the rotor assembly better than prior rotor corrosion treatment methods;

The provision of such a method which requires appreciably less capital investment than other comparable rotor treatment process to incorporate in a manufacturing assembly line;

The provision of such a rotor treatment process which consumes less energy than prior rotor treatment processes;

The provision of such a method in which surfaces between the rotor laminations as well as the visible surfaces of the rotor assembly are treated against corrosion;

The provision of such a method which eliminates the necessity of having to treat the exposed surfaces of the rotor assembly with another corrosion resistant coating material, such as an epoxy coating or the like;

The provision of such a method in which one heating step of the rotor assembly may be utilized for both shrink fitting of the rotor core on the rotor shaft and for the corrosion treatment of the core; and The provision of such a method which effectively prevents or inhibits the formation of corrosion for extended periods of time in high moisture environments.

Other objects and features of this invention will be in part apparent and in part pointed out hereinafter.

SUMMARY OF THE INVENTION

Briefly, the method of this invention for fabricating a corrosion resistant rotor assembly will now herein be described. The rotor assembly generally includes a core made from a stack of plate-like laminations of suitable ferro-magnetic material. The core has a central bore therethrough for the shrink fit reception of a rotor shaft. Specifically, the method of this invention comprises the steps of heating the core to a predetermined elevated temperature. The rotor shaft is then inserted in the bore and the core and the shaft are quenched in an oil bath which is maintained at approximately ambient or room temperature. This last-said step includes at least the partial wicking of the oil between the laminations of the core. Then, the rotor assembly is removed from the oil bath and the oil forms a dry film on the rotor assembly capable of inhibiting the formation of corrosion on surfaces of the rotor assembly and between the laminations for long periods of time, particularly when the rotor assembly is installed in a dynamoelectric machine which is operated in a high moisture environment.

BRIEF DESCRIPTION OF THE DRAWINGS

Corresponding reference characters indicate corresponding parts throughout the several views shown in the drawings.

DESCRIPTION OF A PREFERRED EMBODIMENT

Figure 1:
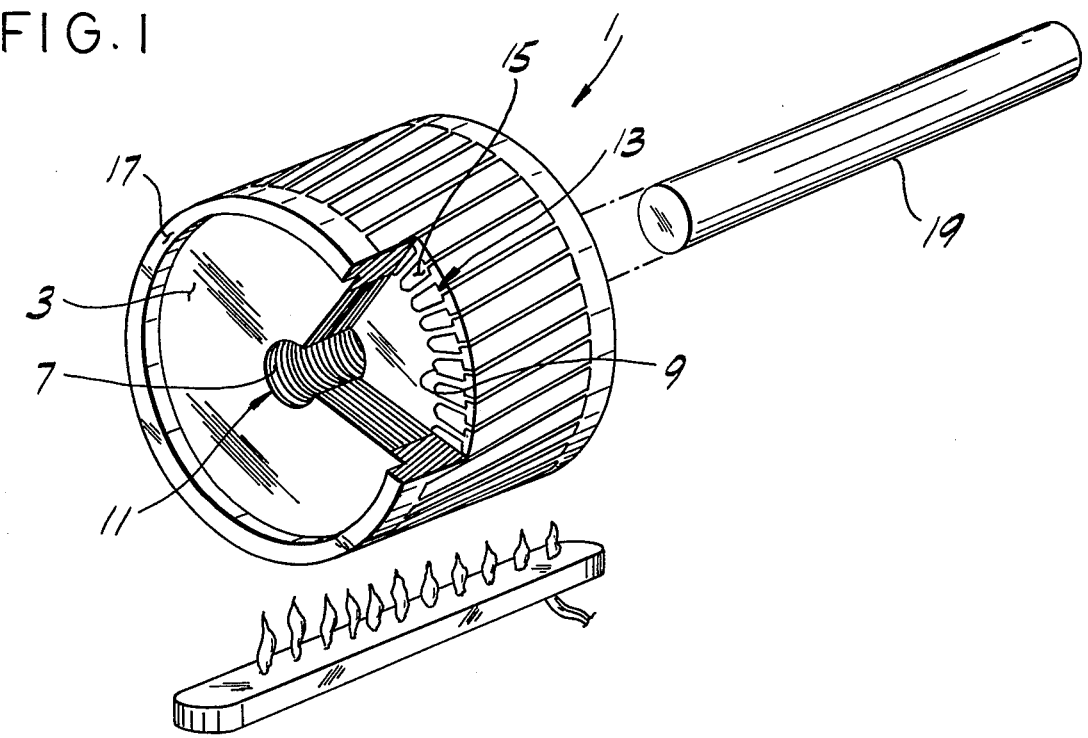
FIG. 1 is a perspective view of a squirrel cage rotor body with a portion thereof cut away for the purpose of illustrating the individual laminations comprising the core of the rotor body and for illustrating the die-cast-in-place rotor bars formed in notches in the outer periphery of the core and with a rotor shaft adapted to be shrink fitted in the bore of the rotor body 1 thereby to fix the core to the rotor shaft.

Referring now to the drawings, a rotor body, as indicated in its entirety at reference character 1, is shown to comprise a core 3 constituted by a stack of identical laminations 5 which are preferably made of thin, plate-like ferro-magnetic material, such as a high magnetic permeability sheet steel or the like. As is conventional, laminations 5 are die punched from sheet steel and have a central opening 7 therethrough and a plurality of generally radial notches 9 in their outer margins with the notches spaced at equal angular intervals therearound. Upon assembly of the stack of laminations to form the core, the laminations are coaxially arranged so that their central openings 7 form a bore 11 extending longitudinally through the core. The laminations are preferably skewed relative to one another (i.e., angularly displaced from one another) so that their notches 9 form slots 13 which extend longitudinally through the core and which are wrapped around the longitudinal axis of the core in helical fashion. The laminations constituting core 3 are typically secured together in stacked relation under a desired compressive loading by any one of several known means, such as by welding the edges of the laminations at spaced intervals therearound. The rotor assembly illustrated is a squirrel cage rotor and, as is typical, has a plurality of die cast-in-place rotor bars 15 formed within slots 13 and further has die cast end rings 17 formed on the end faces of core 3 interconnecting the rotor bars. Typically, after die casting, the core assembly, as illustrated in FIG. 1, is turned in a lathe or other suitable machine so as to form a uniform and even outer cylindric surface concentric with the axis of bore 11.

Bore 11 in core 3 so sized and formed as to be shrink fitted on a rotor shaft 19. That is, the inside diameter of bore 11 is slightly smaller at ambient temperature than the outside diameter of shaft 19 so that upon heating of core 3 to a predetermined elevated temperature, the inside diameter of bore 11 will expand or increase to a size sufficient to receive shaft 19 therewithin. Upon cooling of the core, the latter will contract around the shaft and will securely lock it in place therein thus fixing the core to the shaft.

The method of manufacturing a rotor assembly of this invention involves heating a rotor core 3 to a predetermined elevated temperature which is sufficient to permit a rotor shaft 19 to be fitted in bore 11 of the core for being a fixed or locked in place relative thereto by shrink fitting, and further which is sufficient to cause at least some oxidation of the steel laminations, this oxidation being visually observable as "bluing" on the surface of the laminations. For example, core 3 may be a heated in a gas fired heat treat furnace (not shown) to a desired elevated temperature (e.g., to about 900° F. or 482° C.). However, it will be understood, that the core may be heated in any one of a number of other suitable manners, such as by induction heating or the like. The temperature to which core 3 is desirably heated may, of course, within the broader aspects of this invention, be varied considerably depending on numerous conditions.

Figure 2:
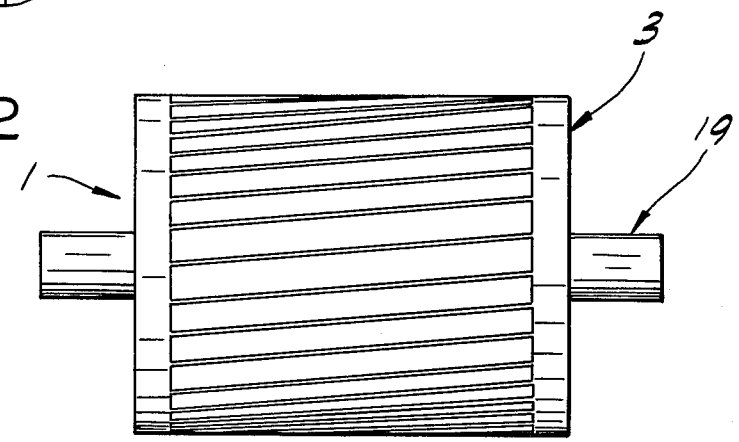
FIG. 2 is a diagrammatic view of a rotor assembly immediately after having its rotor shaft fitted in its bore and as the rotor assembly is immersed or quenched in an oil bath.
Figure 2:
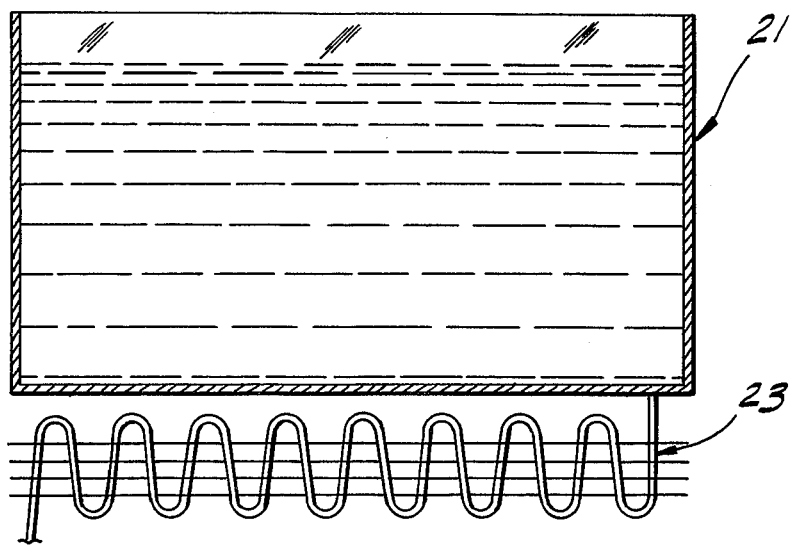

After being heated to its desired elevated temperature, core 3 is removed from the heat treat furnace and shaft 19 is inserted in bore 11 and accurately positioned with respect to the core. Then, further in accordance with one embodiment of the method of this invention, the heated core together with the shaft inserted therein is immersed or quenched in an oil bath 21, as is depicted in FIG. 2. Preferably, the oil in oil bath 21 is a water dispersing, corrosion resistant, petroleum based, solventless oil which is maintained (i.e., cooled) to stay at or near normal room or ambient temperature. One such commercially available oil from Metal Lubricants Company of St. Louis, Missouri under their trade designation Melcoat 4655 has been successfully used in carrying out the method of this invention and thus is disclosed as the best mode for carrying out the method of this invention. However, it will be understood that, within the broader aspects of this invention, any one of a number of similar commercially available oils may be used with similar desirable results.

As noted above, the method of this invention contemplates maintaining the temperature of the oil in oil bath 21 within a predetermined range (e.g., between about 60°–100° F. or about 15°–30° C.) so as to be approximately at ambient or room temperature. Of course, the repeating quenching of heated rotor assemblies 1 in the oil will cause the temperature of the oil to rise beyond the above-noted preferred temperature range. Therefore, as indicated at 23, oil bath 21 is provided with a suitable expansion coil of a refrigeration system so as to carry away excess heat and to maintain the oil in the oil bath within its desired temperature range, and even more preferably to maintain the oil at a temperature of about 75° F. (24° C.). The rotor assemblies are maintained in the oil bath until they are quenched approximately to the temperature of the oil in the oil bath. During quenching, the oil in the oil bath "wicks" between laminations 5 of rotor core 3 as well as covering all visible surfaces. The elevated temperature of the core seems to facilitate the wicking of the oil between the face-to-face laminations and thus the faces of lamination 5 are at least in part coated with the oil.

Following removal of the quenched rotor assemblies from oil bath 21, a dry film will be observed to form on the exposed surfaces of the rotor assembly and on the face-to-face surfaces of laminations 5. This dry film is capable of inhibiting the formation of corrosion or rust on the exposed surfaces of the rotor assembly for long periods of time even in high humidity environments.

As described above, the method of this invention for treating a rotor assembly against corrosion was disclosed in conjunction with a rotor assembly in which the core was affixed to the rotor shaft by shrink fitting. When the method of this invention is employed with such shrink fit rotor assemblies, it is a particular advantage that a single heating step of the core simultaneously serves two functions, viz, to heat the core for shrink fitting and to heat the core for reacting with the oil to form the desired corrosion resistant coating. However, in its broader aspects, the method of this invention is not limited to the simultaneous shrink fitting and corrosion treatment of a rotor assembly. In its broadest aspects, the method of this invention involves heating the core to a temperature which results in at least the partial oxidation of surfaces of the steel laminations of the core and the quenching of the hot core in oil bath 21.

An important aspect of the method of this invention is the treatment of the exposed surfaces (i.e., those surfaces of the rotor which may tend to rust) of the entire rotor assembly with a suitable corrosion resistant oil solution in two steps (i.e., heating and quenching) without the requirement of complicated and involved surface preparation steps of the rotor assembly as was required with prior corrosion treatments. The temperature to which the rotor core is heated and the make up of the oil bath can be varied, but those given in the preferred methods described above have been found to produce optimum results in the minimum amount of time. It is to be understood that these parameters are merely illustrative of the method of the present invention.

In view of the above, it will be seen that the several objects and features of this invention are achieved and other advantageous results attained.

As various changes could be made in the above method or process without departing from the scope of this invention, it is intended that all matter contained in the above description or shown in the accompanying drawings shall be interpreted as illustrative and not in a limiting sense.

I claim:

1. A method of fabricating a corrosion resistant rotor assembly, the latter having a core made from a stack of plate-like laminations of suitable ferro-magnetic material, said core having a central bore therethrough for the shrink fit reception of a rotor shaft, said method comprising the steps of:
heating said core to a predetermined elevated temperature which is sufficient to cause at least some oxidation of said laminations;
inserting said shaft in said bore;
quenching said heated core and said shaft in an oil bath maintained at approximately ambient or room temperature; and
removing said rotor assembly from said oil bath so as to form a dry film on said rotor assembly capable of inhibiting the formation of corrosion on at least certain surfaces of said rotor assembly for long periods of time, particularly when said rotor assembly is installed in a dynamoelectric machine operated in a high moisture environment.

2. The method of claim 1 wherein said oil bath is maintained at a desired temperature level ranging between about 60°–100° F. (15°–38° C.).

3. The method of claim 2 wherein said oil bath is refrigerated so as to be maintained at approximately room temperature.

4. The method of claim 1 wherein the oil in said oil bath is a solventless, petroleum based, water displacing oil.

5. The method of claim 1 wherein said step of quenching the core in said oil bath includes at least the partial wicking of oil between said laminations of said core.

6. A method of fabricating a corrosion resistant rotor assembly, the latter having a core made from a stack of plate-like laminations of suitable ferro-magnetic material, said core having a central bore therethrough for the shrink fit reception of a rotor shaft, said method comprising the steps of:
heating said core to a predetermined elevated temperature sufficient to permit said core to be shrink-fitted on said shaft;
inserting said shaft in said bore;
quenching said core and said shaft in an oil bath maintained at approximately ambient or room temperature; and
removing said rotor assembly from said oil bath so as to form a dry film on said rotor assembly capable of inhibiting the formation of corrosion on at least certain surfaces of said rotor assembly for long periods of time, particularly when said rotor assembly is installed in a dynamoelectric machine operated in a high moisture environment.

7. A method of fabricating a corrosion resistant rotor assembly, the latter having a core made from a stack of plate-like laminations of suitable ferro-magnetic material, said core having a central bore therethrough for the shrink fit reception of a rotor shaft, said method comprising the steps of:
heating said core to about 900° F. (482° C.);
inserting said shaft in said bore;
quenching said core and said shaft in an oil bath maintained at approximately ambient or room temperature for shrink fitting said core on said shaft; and
removing said rotor assembly from said oil bath so as to form a dry film on said rotor assembly capable of inhibiting the formation of corrosion on at least certain surfaces of said rotor assembly for long periods of time, particularly when said rotor assembly is installed in a dynamoelectric machine operated in a high moisture environment.

8. A method of fabricating a corrosion resistant rotor assembly, the latter having a core made from a stack of plate-like laminations of suitable ferro-magnetic material, said method comprising the steps of:
heating said core to a predetermined elevated temperature sufficient to cause oxidation of at least some surface areas of said core;
quenching said heated core in an oil bath maintained approximately at ambient temperature; and
removing said rotor from said oil bath so as to form a dry film on said rotor assembly capable of inhibiting the formation of corrosion on at least certain surfaces of said rotor assembly.

9. The method of claim 8 wherein said oil bath is maintained at a desired temperature level ranging between about 60°–100° F. (15°–38° C.).

* * * * *